May 7, 1940.  H. J. WEITZ  2,200,107
METHOD OF CONDITIONING FERTILIZER
Filed Jan. 23, 1937
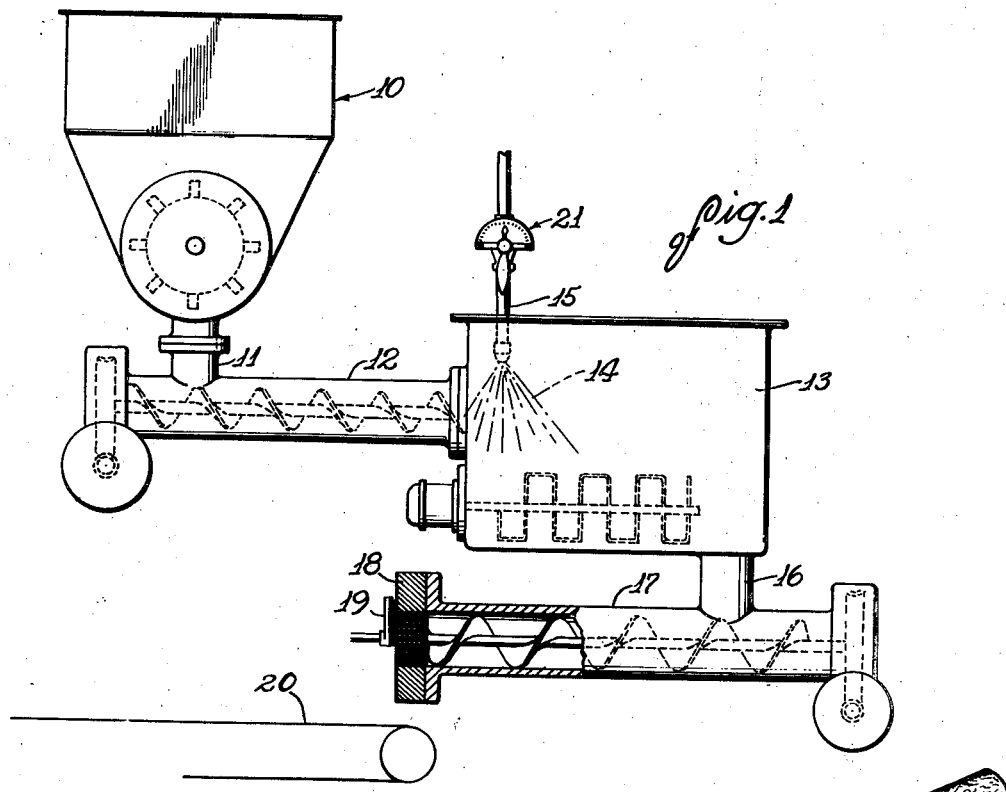
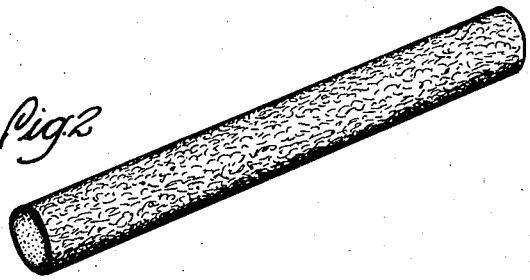
INVENTOR
Henry J. Weitz
ATTORNEYS Patented May 7, 1940

2,200,107

UNITED STATES PATENT OFFICE 2,200,107

METHOD OF CONDITIONING FERTILIZER

Henry J. Weitz, Morris, Ill.

Application January 23, 1937, Serial No. 121,989

7 Claims. (Cl. 71—21)

The invention relates to a method of conditioning fertilizer and the general aim of the invention is to provide a novel process for conditioning organic manure for efficacious, unobjectionable use.

An object of the invention is to provide a new and improved process for producing fertilizing means comprised of animal manure as substantially its only ingredient and which possesses the original fertilizing properties of the manure but is substantially odorless and convenient to store, merchandise and use.

Another object more specifically stated is to produce by an improved process an article in the form of a more or less elongated rod for use in applying fertilizing medium to plant life and having an outer crust which, while being pervious to moisture and capable of complete disintegration, is wear resisting and substantially odorless.

Another object is to provide a novel process for the production of an article having the characteristics above set forth whereby such a crust is obtained by a baking or heating step during forming to strengthen the material in its then somewhat incompletely dry condition.

In conjunction with the foregoing, another object resides in the provision of a process in which an organic manure, after treatment to produce the proper consistency and degree of comminution, is subjected to heat and pressure while in molded form to cause such natural binding material as is present in the manure to agglomerate the particles into a molded article having a hard, substantially smooth outer crust.

Another object is to provide a novel process for producing fertilizer means which includes the step of forming, as by an extruding operation, a moistened mass of material into a desired compact shape, the moisture in said mass being previously added soft water.

Stated more specifically, the foregoing process includes the step of die molding a moistened mass of comminuted manure unmixed with other ingredients to desired shape while utilizing the die-friction induced heat to bake the manure, the baking temperature under any given condition being controlled primarily by the water content of the mass.

Other objects and advantages will become apparent in the following description and from the accompanying drawing, in which:

Figure 1 is a diagrammatic or schematic representation of the equipment for performing the steps of the process embodying the invention.

Fig. 2 is a view in perspective on an enlarged scale illustrating a fertilizing product embodying the invention.

Fig. 3 is a longitudinal sectional view thereof illustrating the protective outer crust.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Generally the method embodying the invention comprises manure, reduction of such for example as sheep manure, to a substantially dry, finely comminuted mass to which is added sufficient water (preferably in a soft or softened condition) to raise its moisture content to within a predetermined range. The homogeneous moistened mass is then expressed or extruded through suitable forming means, such as a die, under such pressure that the material is compressed and water soluble ingredients naturally present bind the particles together while the friction generated heat in the die is utilized to dry the material to the extent that it leaves the die in rod-like form.

Depending upon the characteristics of the mechanism employed in carrying out the process, as well as of the fertilizer material, the water content of the mass just before final forming is such that the heat of the die is maintained at an elevated temperature capable of not only drying the material substantially, but of producing a smooth, hard crust thereon. The crust is wear resisting so that a user may handle material without becoming soiled; the crust apparently seals the odor of the material in the body thereof as the resulting article is substantially odorless; and the crust apparently reinforces the material, since the article is relatively quite rigid and strong, even immediately after formation while the article is still somewhat moist. Nevertheless the crust is completely water pervious and the product will in use become thoroughly disintegrated.

Referring more particularly to the drawing, Fig. 1 shows diagrammatically an arrangement of machine elements suitable for performing the several steps of the process. In this figure, the numeral 10 designates generally a hammer mill or the like by which the manure may be reduced to a suitable degree of comminution. From the mill, the material passes through a conduit 11 to a conveyer 12 by which it is fed to a mixer 13. As the material passes to the mixer, it is sprayed with a jet of water 14 from a supply conduit 15. A conduit 16 from the mixer 13 feeds the moistened material to a conveyer 17 which carries the material to and forces it through a suitable die 18. A cut-off knife 19 severs the material into suitable lengths as it passes from the die, and the material then falls on a conveyer 20 which carries it to a storage or packing point.

It has been found desirable that the machine elements making up the system have certain characteristics to enable the process to be carried out most satisfactorily. Thus, the mill 10 should be capable of reducing the animal manure to such degree of fineness that the comminuted material will pass a one-sixteenth inch mesh screen. The starting material fed into the mill is preferably natural fertilizer in its commercial form, that is, dry and pulverized to pass approximately a one-fourth inch mesh screen. If manure in its original state is used, it should be well dried. It will usually be desirable to screen the material from the mill before it passes to the conveyer 12, since this insures the delivery of a uniform homogeneous mass to the die. The conveyer 12 is of the type which may be regulated to insure constant delivery to the mixer of an unvarying quantity of material.

In the addition of moisture, I have discovered that, while ordinary hard water may be employed with satisfactory results, the use of soft or softened water, as from an apparatus of the zeolite or like mineral type, possesses a number of distinct and unexpected advantages. One feature is that the quantity of water required is considerably less using soft or softened water than when hard water is employed. The material dries more readily and the formed crust moreover is smoother and apparently harder than that obtained using hard water. Furthermore, the mass of an article produced by a process using soft or softened water is at least as compact, if not more so, than when hard water is the moistening agent. An important feature is the peculiarity that less frictional resistance is offered by the forming means or die, less heat generated at the die, and less extruding force required.

In adding the moisture, a spray nozzle capable of producing a finely atomized fog or mist-like spray is preferably employed to disperse the moisture over a relatively wide area and thus facilitate the action of the mixer in producing a moistened mass of uniform consistency having a substantially unvarying water content. The water supply line is controlled by a valve 21 capable of adjustment to provide an exceedingly accurate control of the quantity of added water. The die 18 is replaceable by other dies if desired to vary the dimensions of the extruded material, while the cut-off knife 19 may be synchronized with the operation of the feed screw in the conveyer 17 to produce an elongated article, or it may be otherwise driven to produce articles of various lengths.

The moistened material, as it is forced through the die, creates through friction a substantial quantity of heat which is utilized in a final treatment of the fertilizer material. It has been found that the quantity of heat must be controlled and maintained within proper limits to obtain the desired result. In this instance, temperature control is effected by holding the water content of the material substantially at a predetermined point. Hence a balance is obtained whereby the quantity of heat resulting from the passage of the material through the die is just sufficient to substantially dry the material and produce a hard, firm, and smooth external crust. As previously mentioned, less soft or softened water is required to obtain the same or better results than with hard water.

The addition of moisture to the finely comminuted manure mixture also makes available certain ingredients naturally inherent in the manure which have binding properties. Thus, when the material is forced through the die in relatively highly compressed condition the natural binding agent acts as the material dries to bind the particles into a compact mass. Nevertheless, when the article again becomes wetted in use the binding agent is entirely ineffective to prevent disintegration of the article.

In determining as to the proper quantity of water to be added, a number of different factors should be taken into consideration. The machine elements as a whole, and particularly the rate of feed and the die characteristics, form a set of unvarying factors which should be known. However, the nature of the manure itself introduces a variable characteristic which is the primary factor to be taken into account. For example, a sheep manure derived from a feeding in which the hay content of the ration is small contains a considerably smaller fiber content than if the ration consisted primarily of hay. Where the fiber content of the manure is relatively low, the frictional resistance offered to the passage of the prepared moistened material is much less than where the fiber content is high. As a result, in manures having a low fiber content, less moisture is required than in those having a high fiber content. It has been found that the desired moisture content when hard water is used may vary from fifteen to twenty-five percent by weight of the prepared material, depending upon the nature of the manure. This range is lower when soft or softened water is employed.

In determining the quantity of water to be added through the system 15, the fixed characteristics of the machine elements are first determined generally, after which the nature of the manure to be treated is determined, and the water content of the comminuted material from the mill ascertained. By adjustment of the valve 21, sufficient water is continuously sprayed onto the material passing into the mixer to bring the water content of the mass of material up to substantially the point which will hold the temperature in the die at a desired elevated point. It has been ascertained that, using hard water, a temperature of approximately 150° F. at the die is satisfactory for a sheep manure of average fiber content, and this temperature is maintained by holding the moisture content of the mass just before extruding to approximately twenty percent by weight. A lower die temperature with less water content will produce satisfactory results when soft or softened water is used. These relationships obtain for a die having on the order of eight hundred and fifty three-sixteenths inch die holes in a machine set to deliver approximately four hundred pounds of manure an hour.

Failure to observe the above discussed precautions within reasonable limits causes considerable difficulty. Thus, if the material is much too wet, the temperature of the die will be insufficient to obtain delivery of the extruded material in proper condition and it will be practically impossible subsequently to handle the material. If the material, before extruding, is too dry or only slightly too wet, the material will freeze in and clog the die apertures. When all of the factors are properly correlated, the material will issue from the die and will be delivered to the conveyer in substantially hard, practically dry condition. The conveyor should be of sufficient length to allow the material to cool before it reaches the storage or packing point.

The article obtained by the process comprises, as shown in perspective in Fig. 2 and in section in Fig. 3, an elongated rod-like member composed of highly compressed, finely comminuted particles of the natural manure in unadulterated condition and having an external crust 22 which is hard, smooth and relatively strong. The article may be handled in an ordinary manner without danger that it will break or crumble, and it is substantially odorless, since the outer crust apparently forms an enclosing seal. The article contains only natural manure, no outside substance with the exception of water having been added. The natural resins or binding material in the manure is utilized and an additional binding agent is, therefore, unnecessary.

From the foregoing it will be evident that I have provided a novel process for producing an improved means for supplying fertilizer to plant life. In the form of rod-like sticks approximately one to two inches long and one-quarter to three-sixteenths inches in diameter, the material is convenient for use in potted plants or similar environments, since the article is sufficiently rigid to allow it to be inserted endwise into the relatively loose soil. Otherwise dimensioned, the material may be easily placed in rows or scattered widely without encountering the difficulties resulting from dusty, odorous, pulverized manure. The process may be economically carried out, since it is simple and substantially automatic once the controlling factors thereof have been correlated, and the resulting product may, therefore, be sold at a relatively low cost.

I claim as my invention:

1. The process of preparing natural animal manure for use as a fertilizing medium which includes the step of compressing a moist mass of natural animal manure to produce an article shaped for convenient handling while heating the compressed mass until substantially a hard condition is attained.

2. The process of preparing natural animal manure for convenient use which includes the steps of forcing finely divided manure of this nature through a die after moistening the manure with soft or softened water, and by the friction induced heat in the die at least partially drying the manure to produce a hard but water pervious crust on the product.

3. The fertilizer conditioning process which includes the steps of reducing natural animal manure to finely divided condition, feeding the resulting mass at substantially constant speed, adding water to said mass in controlled quantity to moisten the mass for subsequent passage through a forming means, mixing the moistened mass thoroughly to obtain uniformity in the mass, forcing the mass through a forming means, drying the mass by the heat induced by passage of the mass through the forming means, the moisture content and the induced heat being correlated to produce this result, and cutting the dried material into required lengths.

4. The fertilizer conditioning process which includes the steps of reducing manure having a relatively high fiber content to finely divided condition, feeding the resulting mass at substantially constant speed, adding water to said mass in controlled quantity to moisten the mass for subsequent passage through a forming means, mixing the moistened mass thoroughly to obtain uniformity in the mass, and forcing the mass through a forming means, the moisture content of the mass and the heat induced by passage of the mass through the forming means being balanced to produce a heat ample but not substantially greater than that required to obtain a hard rigid product.

5. The fertilizer conditioning process which includes the steps of reducing organic manure to finely divided condition, adding water to bring the moisture content of the mass within predetermined limits, and expressing the moistened mass through die means, the moisture content limits being predetermined to maintain the friction induced heat at the die means substantially constant and within a range effective to dry and substantially harden the mass as it passes through the die means.

6. The process of preparing natural animal manure for convenient use as a fertilizer which includes the steps of compressing a moistened quantity of finely comminuted natural manure into a mass of desired shape, and baking the material during compression to harden and substantially dry the mass and form a firm external crust thereon.

7. The process of preparing natural sheep manure for use as a fertilizer which includes the steps of feeding a finely ground mass of the natural manure to a forming die, adding water in controlled quantity to maintain the coefficient of friction of the mass within a range which as the mass passes through the forming die will heat the die to a substantially constant temperature that will bake the manure to a hard, substantially dry condition, and forcing the moistened mass through the forming die.

HENRY J. WEITZ.